Feb. 24, 1942.  W. P. NAEGELE ET AL  2,274,497
POWER HACK SAW
Filed May 17, 1939  2 Sheets-Sheet 1
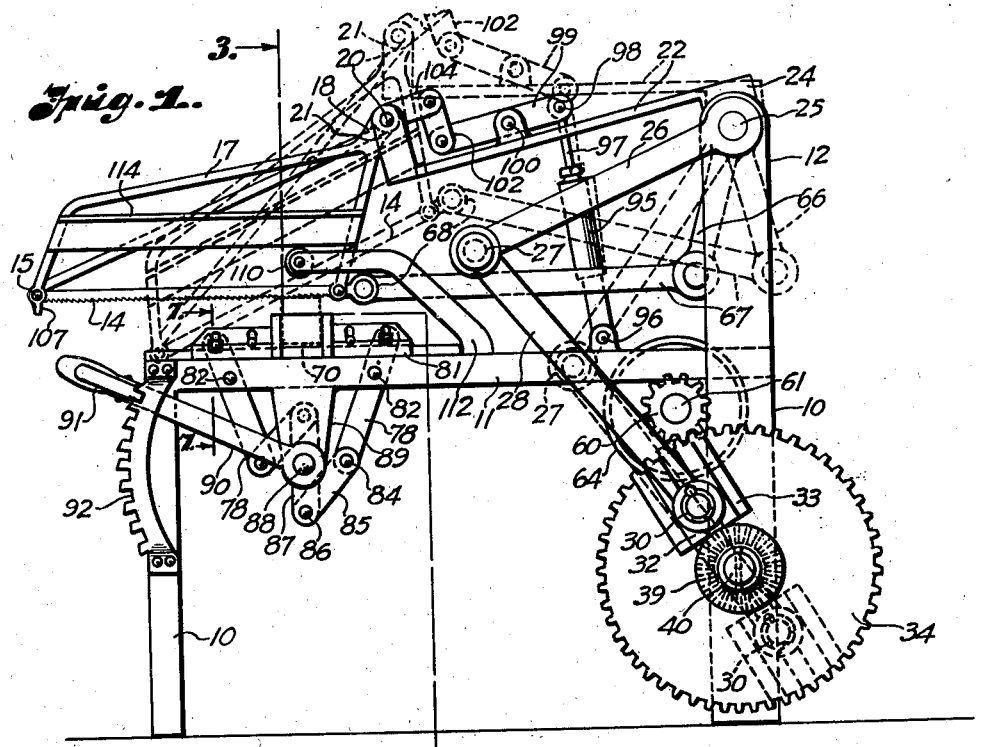
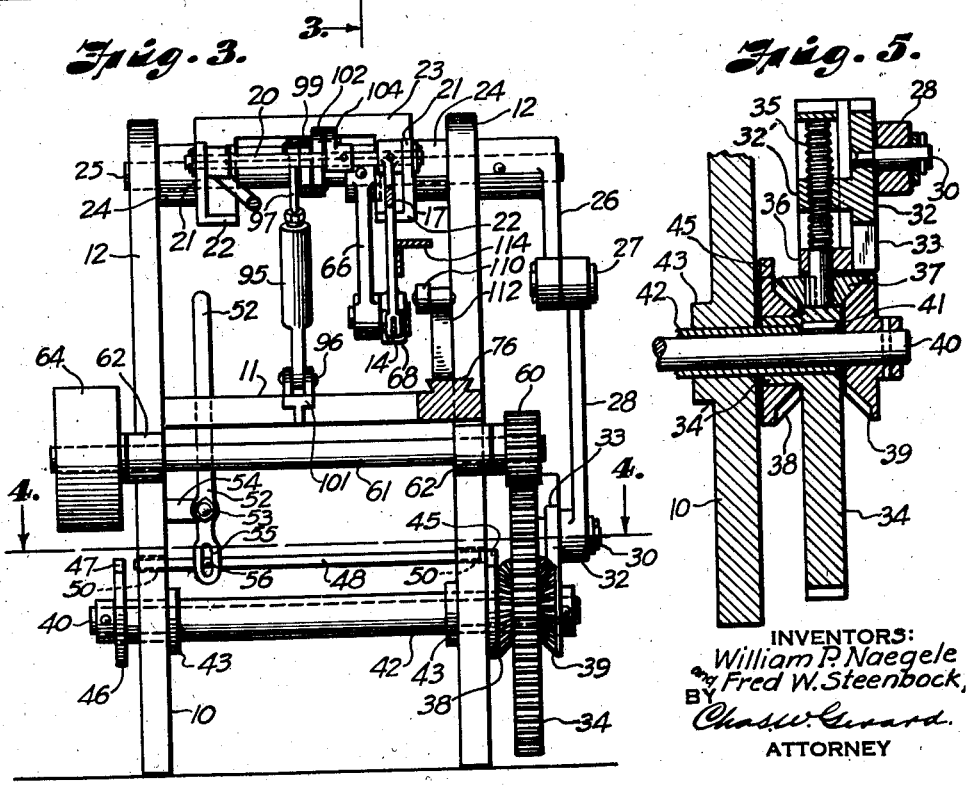
INVENTORS:
William P. Naegele
and Fred W. Steenbock,
BY
Chas. W. Gerard.
ATTORNEY Feb. 24, 1942.   W. P. NAEGELE ET AL   2,274,497
POWER HACK SAW
Filed May 17, 1939   2 Sheets-Sheet 2
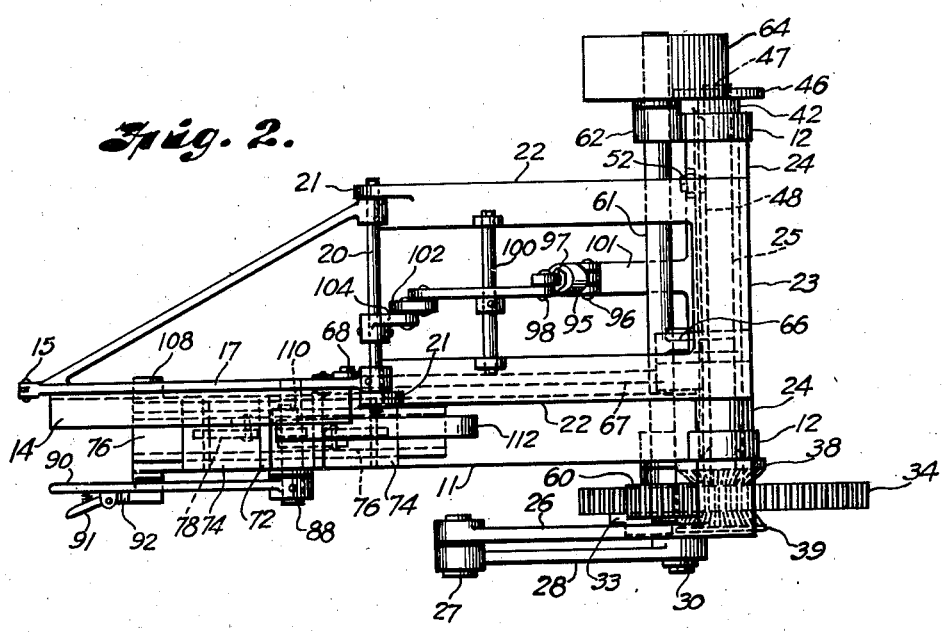
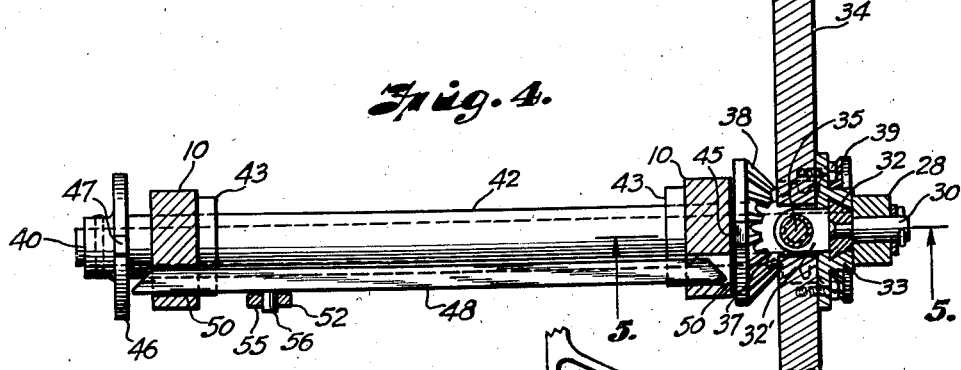
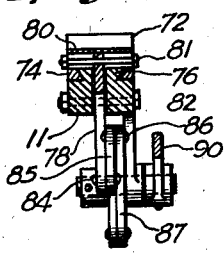
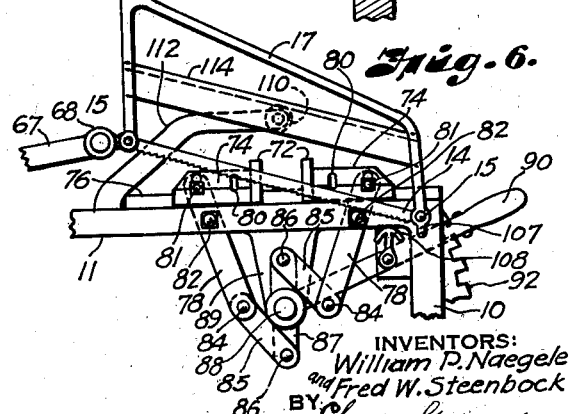
INVENTORS:
William P. Naegele
and Fred W. Steenbock.
BY Chas W. Gerard
ATTORNEY Patented Feb. 24, 1942

2,274,497

UNITED STATES PATENT OFFICE 2,274,497

POWER HACK SAW

William P. Naegele, Lucas, and Fred W. Steenbock, Sylvan Grove, Kans.

Application May 17, 1939, Serial No. 274,094

4 Claims. (Cl. 29—73)

The present invention relates to hack saw machines, and particularly to hack saw apparatus of the power-operated type, and the object we have in view is to devise machines of this character which will operate more efficiently, and also have provision for appropriate adjustment of the sawing operation.

To this end we have devised a power hack saw machine in which the saw is operated with an improved and more efficient working stroke to produce a more effective cutting action, by being operated in such a cutting path and relation to work as to exert increased operating pressure during the cutting action.

The improved construction herein described also includes conveniently adjustable means to vary the working stroke of the saw, and also means for automatically stopping the operation of the machine at the end of the cutting action with reference to a given piece of work.

It is also our object to provide a machine having efficient means for holding the work during the cutting or sawing operation, and also means serving to limit the lowering or feeding movement of the saw during said operation and at the same time not interfering in any way with the operative or reciprocating movement of the saw blade.

A further object of our invention is to provide the saw carriage with means serving to guard against and check any tendency of the saw to execute any sudden abrupt movement at the end of its return stroke preparatory to the beginning of its working stroke, for the purpose of avoiding breakage or other damage to the saw blade.

With the foregoing general objects in view, the invention will now be described by reference to the accompanying drawings which illustrate a practical form of apparatus which we have constructed for embodying the proposed improvements, after which those features and structural combinations believed to be novel and patentable will be set forth and claimed.

In the drawings,

Figure 1 is a side elevation of a power hacksaw machine constructed in accordance with the present invention, and with dotted lines representing different operative positions of the saw and its operating connections;

Figure 2 is a plan view of the machine;

Figure 3 is a vertical sectional view, representing a section taken on the line 3—3 of Figure 1;

Figure 4 is an enlarged horizontal sectional view, representing a section taken on the line 4—4 of Figure 3;

Figure 5 shows a section taken on the line 5—5 of Figure 4;

Figure 6 is a fragmentary side elevation looking in the opposition (as compared with Figure 1) and showing the saw in a position for automatically stopping the machine; and Figure 7 is a detailed sectional view, representing a section taken on the line 7—7 of Figure 1.

Referring to the said drawings now in detail, the machine is illustrated as comprising main framework portions 10 and providing a horizontal shelf or bed portion 11, as well as upright frame extensions 12 at the rear end of the machine.

The hack saw blade is carried by pins 15 at the lower corners of a saw carrying frame 17, thereby providing a carriage for said blade 14. The upper end of the frame 17 is provided with a short extension 18 secured to a transversely extending rock shaft 20 which is mounted in bearings 21 at the front ends of a pair of arms 22 constituting a rocker frame formed with a rear transverse portion 23 which is provided with a pair of bearing projections 24 mounted for rocking movement upon a transverse shaft member 25 which is journaled in the upper end portions of the aforesaid frame extensions 12.

To one end of the transverse shaft 25 is secured a crank arm 26, the outer end of which is pivotally connected at 27 to one end of a pitman member 28, the other end of which member 28 is connected with a wrist pin 30 carried by a wrist pin block 32 which is adjustably mounted in slideway guides 33 attached to the outer face of a gear wheel 34 in such a manner as to provide a radial slideway passage for the radial adjustment of said block 32 with reference to the axis of said wheel 34, for obviously effecting corresponding adjustment of the working stroke of the pitman member 28, as hereinafter more particularly explained.

For accomplishing the adjustment of said wrist pin block 32, an adjusting screw 35 is mounted radially in a bearing 36 adjacent to said slideway passage and in threaded engagement with the shank portion 32' of the block 32, the inner end of the screw 35 being provided with a bevel pinion 37 engaging two oppositely rotatable bevel gears 38 and 39 on opposite sides of the gear wheel 34. One of said bevel gears, the gear 39, is keyed to a transversely extending shaft 40, while the other bevel gear 38 is journaled on the hub portion 34' of the gear wheel 34, and the latter gear 34 is in turn keyed at 41 to a sleeve shaft 42 which fits over the shaft 40 and is carried in bearings 43 at opposite sides of the lower rear portion of the main machine frame.

For selectively controlling the rotation of the bevel gears 38 and 39, the gear 38 is formed with a peripheral lug 45, while one end of the shaft 40 is provided with a disk 46 also formed with a peripheral lug 47, and these lugs 45 and 47 are adapted to be alternatively engaged by the oppositely beveled ends of a sliding detent rod 48 operating through openings 50 in the adjacent portions of the machine frame. The movements of the detent rod 48 are controlled by means of a lever 52 pivoted at 53 upon a projection 54 from one side of the frame and having a slot 55 for sliding engagement with a pin 56 carried by the rod 48.

The gear wheel 34 is driven by means of a drive pinion 60 secured to one end of a transversely extending shaft 61 mounted in bearings 62 and provided at its other end with a belt pulley 64 for connection with a suitable motor or other source of power (not shown).

For actuating the saw by means of the described connections from the gear wheel 34 to said shaft 25, the latter shaft is also provided with a crank arm 66, the lower end of which is pivotally connected with a pitman 67 having its forward end also pivotally connected with a pin 68 attached to the lower rear corner of the saw carrying frame 17—as shown in Figure 1.

The material presented for the cutting action of the saw is held by means of a vise arrangement illustrated in Figures 1, 6 and 7. This vise construction comprises relatively movable clamping jaws 72 carried by slide blocks 74 which are mounted for longitudinal movement along a dovetail track 76 (see Figure 3). For conveniently and simultaneously adjusting these clamping jaws 72, a pair of arms 78 are provided, having at their upper ends suitable pins 81 adapted for sliding engagement with any one of the slots 80 formed in the slide blocks 74 (Figures 1 and 6). These levers 78 are pivoted at 82 to the machine frame, and their lower ends are pivotally connected at 84 to links 85 which are in turn pivotally connected at 86 to the opposite ends of a lever 87 which is fulcrumed at 88 to a bracket 89 and in rigid relation to an operating handle 90, the free end of which is provided with a pawl 91 for latching engagement with a toothed segment 92 secured to the front of the machine frame as shown in Figure 1.

Thus it is clear that by operation of the hand lever 90, the clamping jaws 72 may be simultaneously operated toward or away from each other, for thereby clamping and securing the work in proper position for the cutting operation of the saw.

To overcome any tendency of the saw to catch and execute any casual jumping movement on its return stroke, we provide a suitable oil check cylinder 95, the lower end of which is pivotally mounted at 96 to the bed portion 11 of the machine frame, and its plunger rod 97 is pivotally connected at 98 to one arm of a lever 99 which is fulcrumed at 100 to an arm 101 projecting from the rocker frame 23; the other arm of said lever 99 is pivotally connected by means of a link 102 to a short finger projection which is rigidly secured to the transverse rocker shaft 20, and to which shaft 20 the saw carrying frame 17 is also rigidly secured—see Figures 1, 2 and 3.

In order to automatically stop the operation of the machine as soon as the cutting operation on any particular piece of work is completed, i. e., for the severing of the work as engaged by the clamping jaws 72, the front end of the saw carrying frame 17 is provided with a lug or finger 107 which will be in position at such time to come into engagement with a switch 108 and thereby operate to throw the switch (which may of course be connected in the motor circuit), and thus cut out the power supply to the motor and stop the driving operation.

It may also be desirable to limit the lowering movement of the saw carrying frame, to prevent its dropping too low at the end of the cutting operation, and for this purpose a roller 110 may be mounted on an upwardly extending frame piece 112 in position for engagement by a longitudinal track member, forming a part of the saw carrying frame—thereby limiting the lowering movement of said frame and the saw carried thereby while at the same time not interfering in any way with its longitudinal reciprocating motion as required by the cutting or sawing operation.

In the operation of the improved hack saw apparatus, after the work has been placed in and secured by the vise structure—as indicated by the dotted lines at 70 (Figure 1), a reciprocating movement is imparted to the saw carriage 17 and the hack saw blade 14, by means of the described connections from the gear wheel 34. The full lines in Figure 1 represent the end of the return stroke of the saw, or the beginning of its operating or cutting action. During this operating or working stroke of the saw (which produces the cutting action), the drive connections to the saw carriage execute a backward movement, as clearly illustrated in Figure 1, or in such a manner as to produce an upwardly tilted operation of the saw carriage and the blade 14—as shown in Figure 6, with the rear or advancing end of said blade elevated above its other or trailing end, during said working stroke. Consequently the continuation of the working stroke, in which the saw moves upwardly and rearwardly for producing the cutting or sawing action operates to drag the blade 14 against the work 70 with a greater and more effective working pressure than would be the case if the blade were simply reciprocated entirely in the usual horizontal direction across the work, and hence a more positive and efficient cutting action is produced by such angular working or cutting stroke under the conditions described.

For adjusting the working stroke, the lever 52 is operated in either direction, according to whether it is desired to lengthen or shorten the stroke, and the result of the operation of said lever 52 is simply to hold either of the gears 38 or 39 stationary long enough to move the wrist pin block 32 (by the operation of the screw 35) the required distance for obtaining the proper length of stroke of the pitman arm 28, whereupon the lever 52 is immediately swung back to vertical or neutral position.

As already stated, on completion of the cutting operation, the finger 107 of the saw carriage automatically trips the switch 108 to stop the operation of the machine, at which time the track and roller structure 110—114 limits the drop of the saw and its carriage; and the oil check device 98 and its connections serve to prevent any abrupt jumping movement of the saw carriage which might otherwise break or damage the hack saw blade 14—as will be readily understood.

While we have illustrated and described what we now regard as a practical and efficient form of construction suitable for the embodiment of our proposed improvements, it will be apparent that the construction may be changed and modified in various respects while still embodying the essential features of our invention; and we therefore desire to be understood as reserving the right to make all such changes or modifications as may fairly fall within the spirit ond scope of our invention as defined by the appended claims.

What we claim and desire to secure by Letters Patent is:

1. A power hack saw apparatus comprising work-holding means, a reciprocating saw carriage provided with a hack saw blade, power-actuated means connected with said saw carriage for imparting reciprocating sawing movements to said blade, a roller mounted on a fixed axis in the path of lowering movement of the saw carriage, and a horizontal flange projecting laterally from said saw carriage in position for engagement by said roller only at a given level of said lowering movement of the carriage and thereby limiting said lowering movement while permitting the longitudinal reciprocating movements of the blade.

2. In a power hack saw apparatus, means for clamping the work in position for the sawing operation, a hack saw blade provided with reciprocating means, a pivoted carrier supporting said hack saw blade, rocking means cooperating with said reciprocating means to produce a lifting movement of the advancing end of the saw blade above its opposite trailing end during the cutting movements of the saw blade, and a checking device cooperating with said rocking means for preventing any abrupt jumping movement of said saw carrier and blade.

3. In a power hack saw apparatus, means for clamping the work in position for the sawing operation, a hack saw blade provided with reciprocating means, a pivoted carrier supporting said hack saw blade, rocking means cooperating with said reciprocating means to produce a lifting movement of the advancing end of the saw blade above its opposite trailing end during the cutting movements of the saw blade, a lever carried by said rocking means and pivotally connected with said carrier, and a checking device operably connected with said lever for preventing any abrupt jumping movement of said carrier and blade.

4. In a power hack saw apparatus, means for clamping the work in position for the sawing operation, a hack saw blade provided with reciprocating means, a pivoted carrier supporting said hack saw blade, rocking means cooperating with said reciprocating means to produce a lifting movement of the advancing end of the saw blade above its opposite trailing end during the cutting movements of the saw blade, and means carried by said rocking means and pivotally connected with said carrier for cooperating with said reciprocating means to control the operative position of said carrier.

WILLIAM P. NAEGELE.
FRED W. STEENBOCK.